Sept. 14, 1937.   F. N. BLAKE   2,092,951
FINDING APPARATUS
Filed Jan. 2, 1937
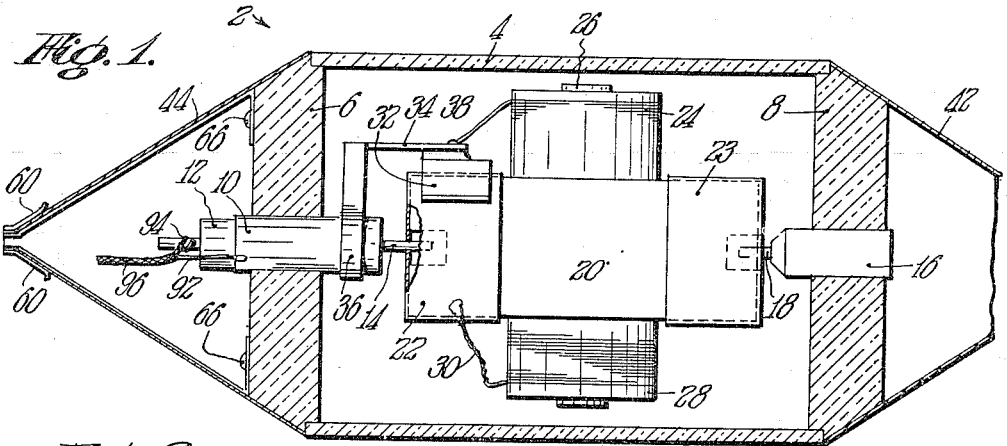
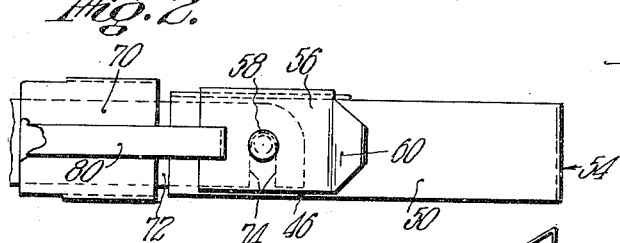
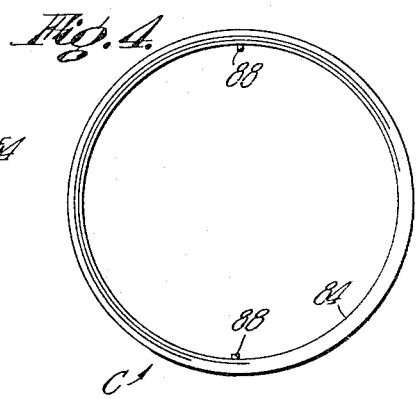
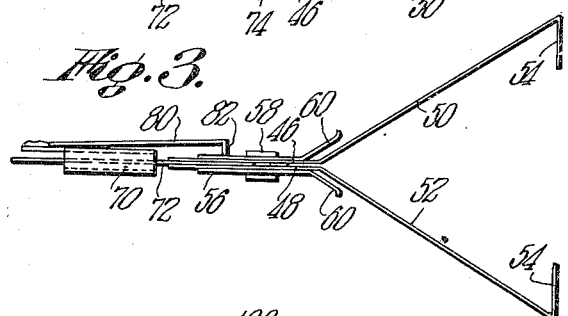
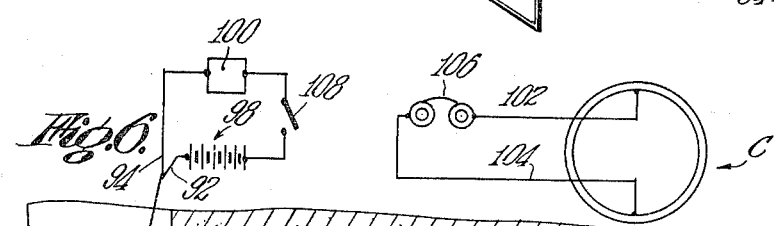
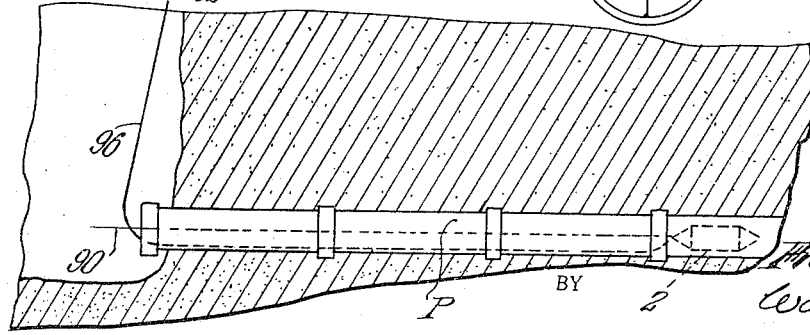
INVENTOR.
Frank N. Blake
BY Walter C. Ross
ATTORNEY.

Patented Sept. 14, 1937

2,092,951

UNITED STATES PATENT OFFICE 2,092,951

FINDING APPARATUS

Frank N. Blake, North Adams, Mass.

Application January 2, 1937, Serial No. 118,844

3 Claims. (Cl. 175—183)

This invention relates to improvements in apparatus for locating pipes and conduits which are disposed below ground and the preferred embodiment of the invention is directed to improvements in apparatus for locating soil or sewer pipes.

The principal objects of the invention are directed to the provision of apparatus for locating soil or sewer pipes below ground which are commonly formed of some non-metallic material.

According to this invention, the pipe-locating apparatus is characterized by the fact that it is not necessary in locating the pipe that the pipe function as a part of the apparatus, as is the case where metallic pipes are used as a conductor of electrical current. In this way, the apparatus is especially arranged to locate pipes that are not good conductors of electricity.

According to special features of the invention, I provide a novel transmitter which is adapted to be inserted in the pipe and, as will be seen, it co-operates with other features of the invention to provide an apparatus which is relatively simple in form and which is efficient in operation.

Various other novel features and advantages of the invention will be hereinafter more fully referred to in connection with the accompanying description of the preferred form of the invention, reference being had to the accompanying drawing wherein:

Fig. 1 is a sectional elevational view through the transmitter of the apparatus of the invention;

Figs. 2 and 3 are plan and side elevational views of parts of the transmitter shown in Fig. 1;

Fig. 4 is a plan view of an induction coil forming a part of the invention;

Fig. 5 is a sectional elevational view through the coil shown in Fig. 4; and

Fig. 6 is a diagrammatic view to explain the operation of the apparatus of the invention.

Referring now to the drawing more in detail the invention will be fully described.

The transmitter of the invention is indicated generally by 2. It consists of a tubular body 4 having end walls 6 and 8 and a sleeve 10 is preferably provided in the end wall 6.

This sleeve 10 is hollowed out and carries a plug 12 which is formed of some insulating material. A rod 14, extending through the plug 12, is adapted to function as a pivot and a conductor, as will appear, while a plug 16 is associated with the end wall 8. The plug 16 also carries a pivot 18.

A carrier member 20 is provided and this is preferably formed of wood or the like. On its opposite ends there are what may be called shells 22 and 23. These members 22 and 23 are journalled on the pivots 14 and 18 as shown.

A coil represented by 24 is carried by the block 20 and this has a core 26 which, in the form of the invention shown, is a soft-iron laminated core of usual form. The lower end of the coil 24 is weighted as at 28 so that the coil tends to assume the position shown in Fig. 1.

Since the members 22 and 23 are mounted on the pivots 14 and 18, the block 20 and coil 24 as well as the shells 22 and 23 are relatively oscillatable or rotatable so that the coil, which is weighted at its lower end as described, may readily assume a position wherein the axis of the coil 24 is disposed perpendicularly when the transmitter 2 is disposed more or less horizontally. This is all for a purpose which will presently appear.

One end of the coil 24 is connected, as by a wire 30, to the shell 22, whereby, the shell being pivoted on pivot 14, the said pivot 14, shell 22 and coil 24 are electrically connected.

An insulating block 32 is associated with the shell 22 and has fixed thereto an arm 34 which carries a part 36. The part 10 is rotatable in the part 36 and the parts 22 and 34 are insulated from one another.

A wire 38 connects the other end of coil 24 to part 34 and thus the said other end of the coil is connected to the part 10. The block 20 and coil 24 are mounted for oscillating or rotating movements on the pivot members 14 and 18 while opposite ends of coil 24 are connected to parts 10 and 14.

Preferably the opposite ends of the transmitter 2 are more or less conical in shape, as shown, to facilitate the transmitters being pushed or pulled along a pipe, and this may be accomplished by providing conical-shaped end members 42 and 44. There may be spaced plate parts 46 and 48 having diverging ends 50 and 52 which extend within the end member 44 and have their extremities 54 secured to the end wall 6. Preferably the end members are filled with paraffin or the like to seal and protect the parts against the elements, etc.

A clamp, indicated by 56, embraces the plates 46 and 48 and is secured thereto as by a rivet 58 or the like. Ears 60 diverging from the member 56 engage the outer end of the member 44 while the extremities 54 of the members 50 and 52 may be secured to the transmitter, as by screws 66 or the like extending into member 6.

A sleeve or slide member 70 is provided and this is preferably in the form of a relatively flat tube. It is arranged to receive the end portions 72 of a tape or the like which, itself, is receivable between the plates 46 and 48. The member 72 is provided with an open ended slot 74 for receiving the rivet 58, which, as stated, extends through plates 46 and 48.

In Figs. 2 and 3 the parts are shown in connected relation but it may be stated that to disconnect the tape member 72 from plates 46 and 48 the part 72 may be swung clockwise by degrees and the rivet 58 disengaged from slot 74.

With the parts in the position shown in Fig. 3, they may be secured together by sliding the sleeve member 70 to the right so as to overlie the parts just described. To insure the parts remaining together in secured relation, a lock in the form of a spring 80 may be provided and this will be secured at one end to the sleeve 70 and have a lip 82 on its other end for co-operating with the rivet 58 or some other projections on one of the plates.

What may be called a receiving coil is shown in Fig. 4 and this includes a suitable support such as a circular support 84 around which is wound a multiplicity of windings represented by 86. The windings 86 are arranged to form a coil and the opposite ends thereof are connected to terminals represented generally by 88.

The method of using the apparatus of the invention will now be described.

First the transmitter 2 is inserted in a pipe represented generally by P in Fig. 6. This may be accomplished by means of a tape member represented by 90 the end 72 of which is connected to the transmitter, as previously described.

Sleeve 10 and pivot 14 are connected to wires 92 and 94 respectively or to a cable 96 which passes out through the member 44 of the transmitter. This cable 96 is carried to a point above ground where the wires 92 and 94 may be connected to a source of energy, such as a battery 98, and a circuit breaker represented generally by 100, all as shown in Fig. 6.

The circuit breaker 100 is of the type adapted to open and break a circuit and the circuit includes the coil 24 of the transmitter and in that way the interruption produced by the circuit breaker provides a signal which is transmitted by the transmitter located in a pipe below ground.

The receiving coil C is connected by connections 102 and 104 to a telephone receiver 106. A switch 108 is preferably provided for controlling the transmitter circuit.

With the transmitter located in the pipe itself and the circuit breaker in operation to open and close the circuit including the transmitter, the operator with the telephone connected to the coil C will receive signals from the transmitter which will be more or less intense according to the distance of the coil C from the transmitter. By moving the coil in different angles the operator is able to locate the general direction of the transmitter and, therefore, the course of the pipe in which the transmitter is disposed.

By traversing the surface of the ground up and down and back and forth and in various directions according to the intensity of the signal it is an easy matter for the operator to locate the coil directly over the transmitter and in that way determine the exact location of the pipe below the ground.

While I have described the invention in great detail and with respect to a preferred form thereof, it is not desired to be limited thereto since many changes and modifications may be made therein without departing from the spirit and scope of the invention. What it is desired to claim and secure by Letters Patent of the United States is:

1. In an apparatus for locating an underground pipe, a transmitter comprising in combination, a shell, a member pivoted therein for swinging movements on a horizontal axis, a coil associated with said member and disposed with its axis opposed to that on which the said member swings whereby said coil may assume a position wherein its axis is perpendicular.

2. In an apparatus for locating an underground pipe, a transmitter comprising in combination, a shell, a member pivoted therein for swinging movements on a horizontal axis, and a coil fixed to said member having its axis disposed at right angles relative to that on which the said member swings.

3. Apparatus for locating an underground pipe comprising, a transmitter comprising in combination, a shell, a member pivoted therein for swinging movements on a horizontal axis, and a coil fixed to said member having its axis disposed at right angles relative to that on which the said member swings, said means including a pair of spaced plate members associated with said transmitter and a tape member engageable between said plate members.

FRANK N. BLAKE.